United States Patent [19]

Habraken et al.

[11] Patent Number: 5,267,036
[45] Date of Patent: Nov. 30, 1993

[54] VIDEO CODER/DECODER WITH SHIFT PREVISION FOR CORRECTLY DECODED SIGNAL BLOCKS

[75] Inventors: Egidius A. P. Habraken; Peter H. N. De With, both of Eindhoven, Netherlands

[73] Assignee: U.S. Philips Corporation, New York, N.Y.

[21] Appl. No.: 822,495

[22] Filed: Jan. 17, 1992

[30] Foreign Application Priority Data

Jan. 21, 1991 [EP] European Pat. Off. ........ 91200093.2

[51] Int. Cl.⁵ .......................................... H04N 7/12
[52] U.S. Cl. ................................... 358/133; 358/141; 358/433
[58] Field of Search ............... 358/141, 133, 433, 148; 375/122, 27

[56] References Cited

U.S. PATENT DOCUMENTS 5,036,391 7/1991 Auvray et al. ................... 358/133
5,063,608 11/1991 Siegel .......................... 358/133 X
5,148,271 9/1992 Kato et al. .................... 358/133

FOREIGN PATENT DOCUMENTS 0061288 9/1982 European Pat. Off. .

OTHER PUBLICATIONS

Scene Adaptive Coder, IEEE Transactions on Communications, vol. COM. 32, No. 3, Mar. 1984, pp. 225–231 Chen et al.
On Adaptive DCT Coding Techniques for Digital Video Recording, IERE Proc. 7th Int. Conf. Video, Audio & Data Recording, Mar. 22–24, 1988, York (UK), pp. 199–204.
ICASSP 88, Volume 11 Multidimensional Signal Processing, Apr. 11–14, 1988 New York Hilton, New York City, pp. 1312–1315.

Primary Examiner—Victor R. Kostak
Attorney, Agent, or Firm—Michael E. Marion

[57] ABSTRACT

A coded data stream with end-of-block (EOB) words is divided into groups each having n EOB words so that loss of an EOB word can be determined at the receiver. When such loss is determined, EOB word(s) is or are inserted locally at the receiver to prevent shift of correctly decoded blocks relative to their true position in the image to be reconstructed.

12 Claims, 2 Drawing Sheets

VIDEO CODER/DECODER WITH SHIFT PREVISION FOR CORRECTLY DECODED SIGNAL BLOCKS

BACKGROUND OF THE INVENTION

The present invention relates to digital video signal processing for recording or other transmissions and, more particularly, to receivers or monitors wherein loss of synchronization causes shifting of parts of the image generated by otherwise correctly decoded video signals.

Digital coding techniques are used to reduce the amount of data for storage and/or other types of transmission of digitized video information signals. Transform coding and variable word-length coding are among well-known techniques to obtain efficient data compression. These techniques are often combined.

Loss of synchronization is a key problem in variable word-length decoding of compressed data. In the case of transformed images that are coded with variable word-length codes, many pixel blocks may pass before re-synchronization takes place. Even after a return to synchronization, it may not be possible to put the correctly decoded data in the proper position in the picture. There is thus a distortion of the decoded picture due to a shift of data. This is shown in FIG. 1, where the top and bottom parts of a tree are clearly misaligned.

SUMMARY OF THE INVENTION

It is an object of the present invention to insure re-synchronization and to prevent the shifting of part of the picture described above.

It is a further object of the present invention to provide a solution for this problem which results in a reliable system relatively immune to channel errors.

The present invention is an apparatus having first means for generating video image signals and for grouping the image signals into image signal blocks, each image signal block including an end-of-block signal signifying its end, and coding means connected to the first means for coding at least the image signals in a given coding format and creating a coded data stream comprising the coded image signals and the end-of-block signals, characterized in that means are connected to the coding means for grouping the coded data stream into data groups each having a preselected number n of end-of-block signals, whereby loss of an end-of-block signal can be determined at the receiver.

At the decoder, the received coded data stream is decoded and end-of-block signals are inserted into the decoded data stream whenever less than n end-of-block signals are received per data group, whereby the correct position of all parts of the image relative to each other is achieved.

Additional advantages and details of the present invention will become clear in light of the following description taken into conjunction with the drawing.

DETAILED DESCRIPTION OF THE PREFERRED EMBODIMENTS OF THE INVENTION

Figure 1:
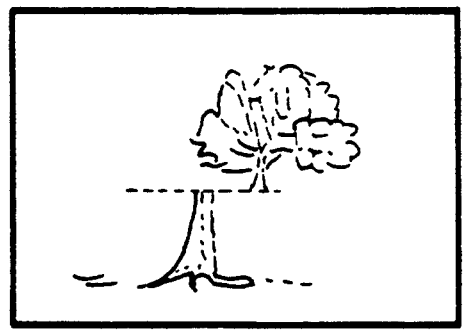
FIG. 1 illustrates the shifting of one part of a correctly decoded image.

In a particular embodiment of a variable word-length coding-decoding system in which the present invention is applicable, the picture is divided into small two dimensional blocks which are coded sequentially. In the first step each block is transformed using the discrete cosine transform. Thereafter, the transformed signal is quantized and variable length coded. This is described, for example, in Chen & Pratt, "Scene Adaptive Coder", IEEE Trans. on Comm., Vol. COM-32, pp. 225–232, March 1984 and in De With & Borgers, "On adaptive DCT coding techniques for digital video recording", IERE Proceedings of 7th Int. Conf. on Video, Audio & Data Recording, York (UK), March 1988, pp. 199–204. This encoding results in a bit stream which is a multiplex of amplitude and address words followed by an end-of-block (EOB) word which is an indication for the decoder that the following data belongs to the next block. In the variable word-length coder, data words with the associated EOB words are mapped to variable word-length code words. This coding scheme is used illustratively only. Application of the present invention is in no way limited thereto.

According to the present invention, the coded sequence per field or frame is divided into data groups of n blocks. This division can be accomplished in a variety of ways. At one extreme, n=2, and each end-of-block signal has an additional bit which is alternately "1" and "0". When n is larger than 2, more bits could be used to indicate the specific position of a block in the group. However, it is only necessary to distinguish the last end-of-block signal in a group from the others. Thus a single additional bit per end-of-block word could suffice even for larger groups.

In a preferred embodiment, however, a synchronization signal or word is inserted in the data stream instead of, or after, the nth end-of-block signal. The latter embodiment will be described in detail below. Various modifications, including those mentioned above, can then be readily implemented by one skilled in the art.

For the embodiment using a synchronization signal after in every group of n end-of-block signals, the coded sequence has the following format:

$$k*(SYNC + n\{mi(\text{word}) + EOB\}),$$

where:
- $mi$ = number of data words in block i;
- $n$ = number of blocks (EOB's) between two synchronization words;
- $SYNC$ = synchronization word;
- $k$ = number of synchronization words in a picture.

It will be noted that the only additional words within the sequence are the synchronization words.

At the decoder, synchronization loss leads to information loss for an unknown amount of data, namely until the next synchronization word is recognized. The information loss may well cover several coded blocks so that a number of EOB words are missing. This results in two kinds of distortion. Channel errors may perturb the data, causing erroneous decoding of blocks which, in turn, results in a "noisy" part of the picture. This type of distortion is not addressed by the present invention. It will last until synchronization is re-established. The second kind of distortion consists of correctly decoded blocks which, after loss of synchronization, are shifted relative to the remainder of the image since their correct location cannot be determined because of the missing EOB words. This shift is extremely disturbing and can be avoided in a majority of the cases with the means of the present invention.

One way to prevent the shift of correctly decoded data is to make use of the above-mentioned synchronization words or signals. The number of EOB words between two synchronization words is known in advance, so that by counting the number of received EOB words, it is possible to insert the missing number of these words at the time the next synchronization word is decoded. This will allow correct positioning of the decoded blocks without modification of rest of decoder.

The above-mentioned solution works only if the synchronization words themselves are free of error. Since this is not necessarily the case, their resistance to such error may be improved by adding an identification to some or all of them. For example, the identification can be a modulo n counting value. The probability that k adjacent synchronization word, will be distorted is significantly smaller than an error occurring in one synchronization word, even when k equals unity.

For example, if n is the number of EOB's between two synchronization words, the counter is a modulo-2 counter, and p EOB words are counted between two synchronization words both having identification O, then the number of EOB words to be inserted is $2*n-p$.

The EOB inserter of the present invention can be interconnected with the variable length decoder and the buffer memory of the conventional decoder configuration in a number of ways. Three possibilities are mentioned here.

Figure 2:
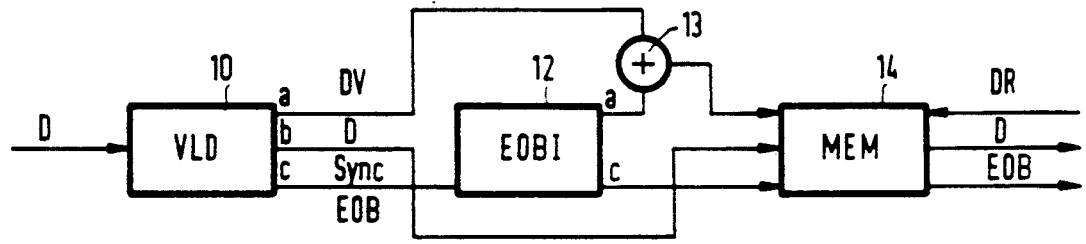
FIGS. 2, 3 and 4 illustrate in block diagram form possible interconnections of the end-of-block signal inserter according to the present invention with a variable word-length decoding system.

For the first possibility, the EOB inserter 12 is connected between a variable word-length decoder (VLD) 10 and a buffer memory (MEM) 14. This is illustrated in FIG. 2. Specifically, received data is decoded in VLD 10. Output lines a, b and c of VLD 10 carry, respectively, "data valid" (DV) signals or words, data, and, on line c, synchronization and EOB words, each with associated identification signals, if any.

The data output on line b is directly applied to MEM 14. The "data valid" words on line a are combined with similar words on a line a' at the output of EOB inserter 12 in an OR-gate 13. The output of OR-gate 13 is also connected to MEM 14, to verify that data should be entered. Finally, the synchronization and EOB words decoded in VLD 10 are applied to EOB inserter 12 where they are processed as described with reference to FIG. 5 below. EOB words on output line c' of EOB inserter 12 are applied directly to MEM 14. In this system, the number of EOB's which can be inserted is limited since the variable length decoder (VLD) must decode the data from the channel in real time (fixed input rate). The only time window available for insertion of the EOB words is thus during reception of the synchronization word and the following identification bits. Therefore the maximum number of end-of-block words which may be inserted depends on the length of the synchronization word.

Figure 3:
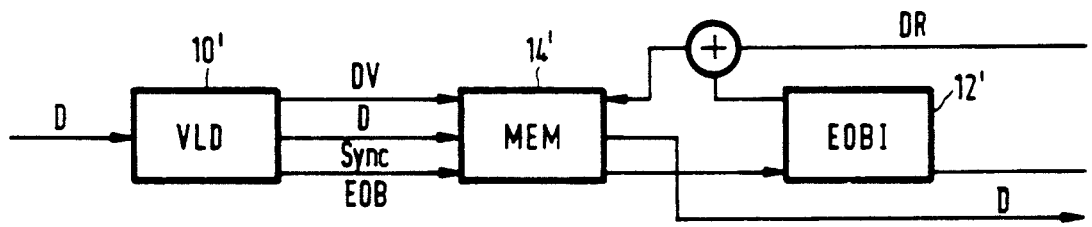

In the arrangement shown in FIG. 3, EOB inserter 12' is located after variable length decoder 10' and buffer memory 14', the latter two being connected in cascade in the order mentioned. Here, the number of EOB words which can be inserted is almost unlimited since the buffer holds all the decoder data before insertion. However, a larger buffer memory is required than in the system illustrated in FIG. 2, since the control inputs to the EOB inserter (see FIG. 6) must be stored.

Figure 4:
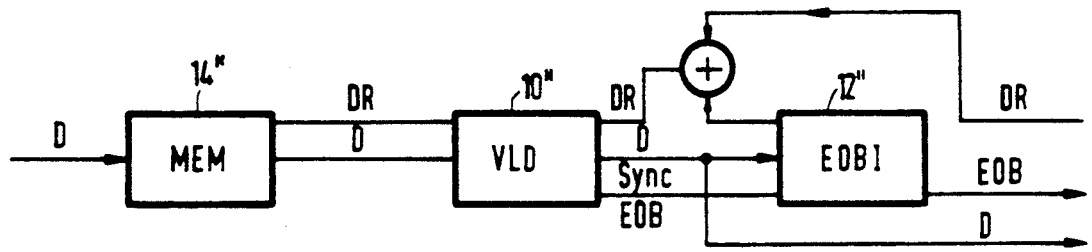

The arrangement illustrated in FIG. 4 is the same as that illustrated in FIG. 3, except that the position of buffer memory 14" and variable length decoder 10 has been reversed. Here, buffer memory 14" is organized for a serial output and variable length decoder 10 runs at a fixed output rate. In this system, the number of EOB words which can be inserted is almost unlimited, but a complex control is required.

It is to be noted in FIG. 4 that data request signals may be transmitted directly to buffer memory 14, or via the variable length decoder 10.

Similarly, data request signals in FIG. 3 may pass through or bypass EOBI 12, as may data and "data valid" signals in FIG. 2.

Figure 5:
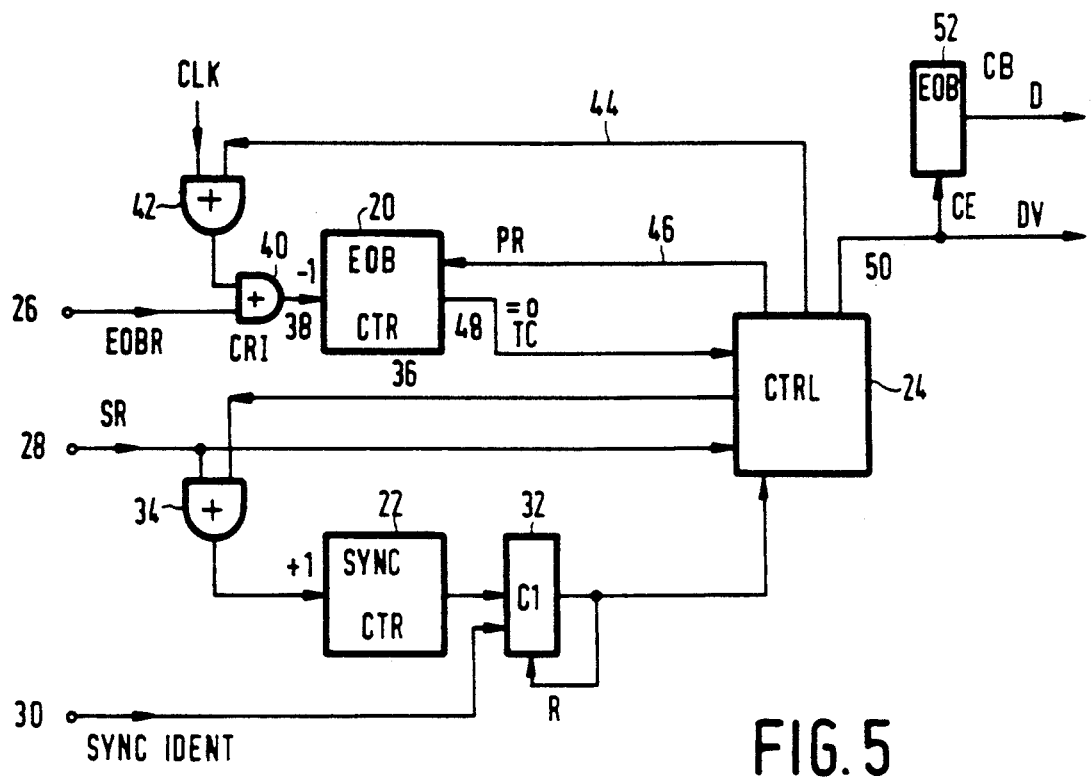
FIG. 5 is a block diagram of the end-of-block inserter of the present invention.

FIG. 5 is a more detailed diagram of the EOB inserter itself. The basic blocks illustrated in FIG. 5 are two counters. The first is an EOB word counter 20, the second is a synchronization signal counter 22. Also shown is a control block 24. The circuit of FIG. 5 receives the following signals from the variable word-length decoder 10 or memory 14. First, a signal "EOBR" (EOB received) at a terminal 26, a signal SR (synchronization signal received) at a terminal 28 and the sync identification signal (sync ID) at a terminal 30. The signal from terminal 30 is applied to one input of a comparator 32 whose other input receives the count output of counter 22. The count in counter 22 is advanced by the output of an OR-gate 34 which has a first input receiving the signal from terminal 28 and a second input receiving a signal from a control output line 36 of control unit 24.

Counter 20 has a count down input 38 which is connected to the output of an OR-gate 40. OR-gate 40 receives the EOBR signal on line 26 at a first input and a signal from the output of an AND-gate 42 at a second input. The first input of AND-gate 42 receives a clock signal, while the second input receives a signal on an output line 44 of control block 24. An output 46 of control block 24 is connected to a further input PR of end-of-block counter 20. The latter has an output 48 which is connected to an input of control block 24. The main output of control block 24 appears on a line 50, which is connected to an output buffer 52.

The EOB inserter described above works as follows: control block 24 recognizes four different situations upon receipt of a synchronization word.

First, EOB counter 20 has counted to zero and comparator 32 indicates that the synchronization identification signal on line 30 corresponds to the output of counter 22. Under these conditions, the system is operating correctly and the signal on line 46 causes counter 20 to be set to the number n of EOB word which will precede the next synchronization signal.

Under the second condition, comparator 32 signals that the synchronization identification on line 30 corresponds to the output of counter 22, but counter 20 is not at zero. This causes a "1" to appear on line 44 and, therefore, at the output of AND-gate 42 upon receipt of the next clock signal. OR-gate 40 will thus furnish an output which causes counter 20 to count down one step. In every clock period, output buffer 52 is enabled by control block 24 via line 50. Another end-of-block word is thereby inserted on the data bus under control of a "data valid" signal on line 50. When the countdown on counter 20 reaches zero, condition 1 exists and decoding of the following n variable word-length blocks begins. The clock rate must be sufficiently high that the counter has finished counting down before the next end-of-block word is received.

The third possibility is that counter 20 is at zero, but that comparator 32 signals that the output of counter 22 does not match the synchronization identification word received on line 30. Under these conditions, control block 24 outputs a signal on line 36 which, via OR-gate 34, causes the count on counter 22 to be raised by 1. Simultaneously, control block 24 resets counter 20 to the number of EOB words (n) between synchronization signals via a signal on line 46. Control block 24 then outputs a signal on line 44 to start counting down on counter 20. During each counting down step, an EOB word is transferred from buffer 52 to the data bus. If comparator 32 does not indicate equality at its two inputs after the above-mentioned increase of one count on counter 22, counter 20 is reset to n after it has reached zero, and the next n EOB words are inserted on the data bus. As soon as comparator 32 indicates coincidence at its two inputs, EOB counter 20 is reset to n and decoding of the following variable word-length block begins.

Finally, if end-of-block counter 20 is not at zero and the synchronization identification word received on line 30 does not match the count on counter 22, control block 24 first causes a count-down on counter 20 with transfer of an EOB word from buffer 52 to the data bus for each count. When counter 20 reaches a count of zero, the system operates as described under the third possibility above.

The present invention has been described with reference to a specific embodiment of an end-of-block inserter interconnected with the variable word-length decoder and its associated memory as indicated in FIG. 3. Here it must be repeated that the end-of-block signal from buffer memory 52 has to be synchronized with the outgoing data stream, i.e. the output of buffer 52 is applied, for example, to a multiplexer which also receives the data signals (the EOB signals from buffer 52 being inserted only in the event of an error as described above).

Figure 6:
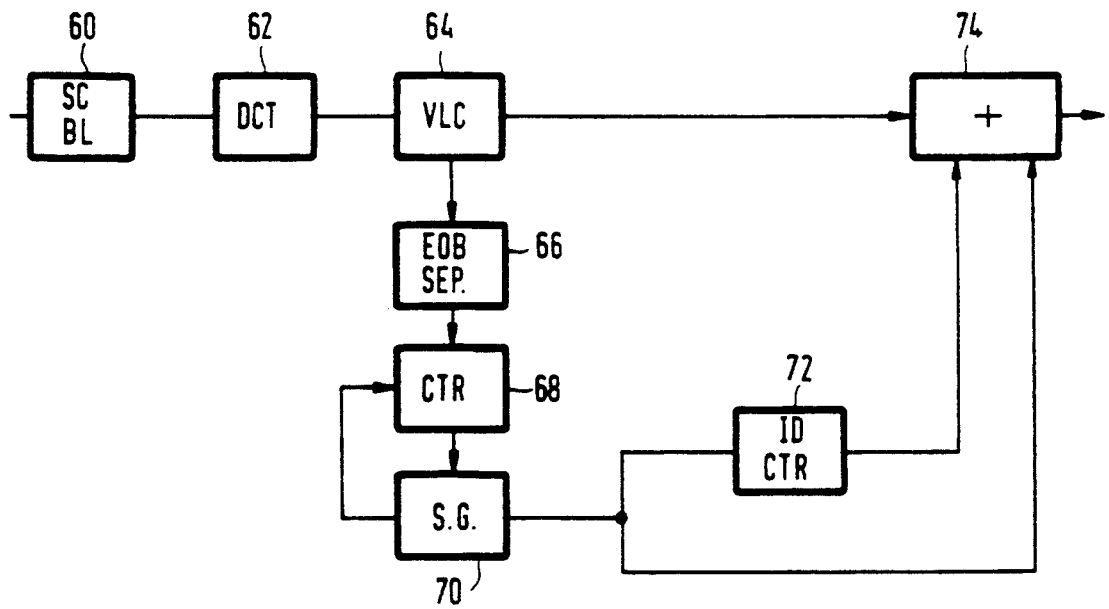
FIG. 6 is a simplified block diagram of the coder of the present invention.

FIG. 6 is a simplified diagram of the transmitter or encoding circuitry required for implementing the present invention. A block 60 includes the scanning and division into two-dimensional blocks each having an associated address and end-of-block signal. These signals are subjected to a discrete cosine transform in a stage 62. The output of stage 62 is quantized and subject to variable word-length coding in stage 64. The output of stage 64 is thus a coded stream of amplitude and address words followed by end-of-block words. The end-of-block words are extracted in a stage 66. They are counted in a counter 68 which, at a predetermined count, furnishes a signal to the synchronization signal generation stage 70. An output from stage 70 causes the reset of counter 68 and an input to a counter 72 which preferably is a modulo n counter as mentioned above. The output of counter 72 is the synchronization identification signal. This, as well as the synchronization signals as such and the output of stage 64 are applied to a multiplexer 74 whose output is the signal which is to be recorded or otherwise transmitted. It should also be noted that many variations of the particular embodiment illustrated in FIG. 6 are possible. For example, an identification scheme such as the one illustrated for the synchronization signal could be applied to the end-of-block signals as described above, or in addition to its application to the synchronization signals. The latter would obviate the necessity for counting down on counter 20. Other variations and changes are also possible, will be readily apparent to one skilled in the art and are intended to be encompassed in the following claims.

We claim:

1. Apparatus having first means for generating video image signals and for grouping the image signals into image signal blocks, each image signal block including an end-of-block signal signifying its end, and coding means connected to the first means for coding at least the image signals in a given coding format and creating a coded data stream comprising the coded image signals and the end-of-block signals, characterized in that means are connected to the coding means for grouping the coded data stream into data groups each having a preselected number n of end-of-block signals, whereby loss of an end-of-block signal in a data group can be determined and compensated at the receiver so that decoded image signal blocks are correctly positioned relative to one another.

2. Apparatus as claimed in claim 1, wherein the grouping means comprises end-of-block signals separator means for separating the end-of-block signals from the coded data stream, first counting means connected to the end-of-block separator means for counting the end-of-block signals and generating a first counting signal signifying a count of n thereof, and means connected to the first counting means for generating a synchronization signal and inserting the synchronization signal into the coded data stream in response to the first counting signal.

3. Apparatus as claimed in claim 2, further comprising second counting means for counting the synchronizing signals and furnishing identification signals corresponding to the number of so-counted synchronization signals, and wherein a first identification signal is inserted into the coded data stream with at least selected ones of the synchronization signals.

4. Apparatus as claimed in claim 3 further comprising a decoding means for receiving the coded data stream and furnishing a decoded data stream grouped/divided into the data groups in response thereto, third counting means coupled to the decoding means for counting the end-of-block signals in each of the groups and furnishing a missing EOB signal when the so-counted number is less than n, and insertion means connected to the third counting means for inserting at least one end-of-block signal in the decoded data stream in response to the missing EOB signal.

5. Apparatus as claimed in claim 2 further comprising a decoding means for receiving the coded data stream and furnishing a decoded data stream grouped/divided into the data groups in response thereto, third counting means coupled to the decoding means for counting the end-of-block signals in each of the groups and furnishing a missing EOB signal when the so-counted number is less than n, and insertion means connected to the third counting means for inserting at least one end-of-block signal in the decoded data stream in response to the missing EOB signal.

6. Apparatus as claimed in claim 1 further comprising a decoding means for receiving the coded data stream and furnishing a decoded data stream grouped/divided into the data groups in response thereto, third counting means coupled to the decoding means for counting the end-of-block signals in each of the groups and furnishing a missing EOB signal when te so-counted number is less than n, and insertion means connected to the third counting means for inserting at least one end-of-block signal in decoded data stream in response to the missing EOB signal.

7. Apparatus as claimed in claim 1, wherein each end-of-block signal comprises a plurality of bits; and wherein the grouping means comprises at least one identification bit for each of the end-of-block signals.

8. Decoding apparatus receiving a coded data stream comprising video image signals grouped into image signal blocks each having an end-of-block signal, a plurality n of the image signal blocks constituting a data group, further comprising EOB counting means for counting the end-of-block signals in each data group and for furnishing a missing EOB signal when the so-counted number is less than n, and insertion means connected to the EOB counting means for inserting an end-of-block signal into the decoded data stream in response to a missing EOB signal, whereby decoded end-of-block signals are correctly positioned relative to one another even upon loss of an end-of-block signal.

9. Decoding apparatus as claimed in claim 8, wherein the received coded data stream further comprises a plurality of synchronization signals, each at the end of one of said data groups;

and wherein the EOB counting means count end-of-block signals between sequential ones of the synchronization signals.

10. Decoding apparatus as claimed in claim 9, wherein the coded data stream further comprises sync identification signals distinguishing at least selected ones of the synchronization signals from at least the respective next following synchronization signals, and further comprising means for separating the sync identification signals from the coded data stream.

11. Decoding apparatus as claimed in claim 10 further comprising means for generating a local sync identification signal in response to received synchronization signals, and comparator means connected to the local sync identification signal generating means for comparing the local sync identification signal to the received sync identification signal and generating a comparator output signal only upon agreement therebetween.

12. Decoding apparatus as claimed in claim 11, wherein the insertion means insert n end-of-block signals into the decoded data stream in the absence of a comparator output signal following receipt of a synchronization signal.

* * * * *